Nov. 5, 1968  W. D. MOUNCE ET AL  3,409,870
SEISMIC EXPLORATION METHOD FOR DELINEATING AN AREA OF
A SEISMIC WAVE REFLECTING EARTH INTERFACE
Filed Jan. 18, 1965  9 Sheets-Sheet 1

INVENTORS.
WHITMAN D. MOUNCE,
JOHN D. BALL,
TOBIAS FLATOW,
BY John B. Davidson
ATTORNEY.

INVENTORS.
WHITMAN D. MOUNCE,
JOHN D. BALL,
TOBIAS FLATOW,

INVENTORS.
WHITMAN D. MOUNCE,
JOHN D. BALL,
TOBIAS FLATOW,

FIG. 16.

INVENTORS.
**WHITMAN D. MOUNCE,
JOHN D. BALL,
TOBIAS FLATOW,**

United States Patent Office 3,409,870
Patented Nov. 5, 1968

3,409,870
SEISMIC EXPLORATION METHOD FOR DELINEATING AN AREA OF A SEISMIC WAVE REFLECTING EARTH INTERFACE
Whitman D. Mounce, John D. Ball, and Tobias Flatow, Houston, Tex., assignors, by mesne assignments, to Esso Production Research Company, Houston, Tex., a corporation of Delaware
Filed Jan. 18, 1965, Ser. No. 426,102
8 Claims. (Cl. 340—15.5)

This invention relates to geophysical prospecting using seismic techniques, and, more particularly, to exploring an area of the earth's subsurface, using the seismic technique.

The general method of geophysical exploration utilizing seismic waves in the earth is well known. Briefly stated, this method comprises the steps of initiating a seismic impulse at or near the surface of the earth, and recording signals generated by geophones as a result of the earth's movement at one or more points more or less spaced from the point of origin of the seismic impulse. The recordation must permit measurement of the time elapsing between the instant of the origination of the impulse and the generation of signals as a result of the subsequent earth movement. The original impulse will set up elastic waves that are transmitted through the earth. Any discontinuity or variation of structure within the earth will reflect and/or refract a portion of the energy in the waves so that a recording of the signals from the receiving point will comprise a number of arriving waves, each derived from the original impulse and each differing from the others in time of arrival, magnitude, and wave shape, or all three. The usual type of seismogram produced by the technique described above comprises a plurality of traces varying in amplitude along a time axis from a common reference point which is the time at which the impulse was initiated. The traces are recorded side-by-side so that events thereon produced by reflections from a given discontinuity may be identified by the manner in which they line up across the record. Manifestly, a multiplicity of traces are required in order to distinguish between reflections and noise.

In accordance with the usual techniques practiced heretofore, either a linear array of spaced detectors are arranged on both sides of a seismic impulse point, or a single, fixed-location seismic detector or pattern of detectors is used, and the earth is repetitively impulsed along a straight line passing through the detecting location. In the first technique, a seismogram is formed by simultaneously recording geophone output signals produced by a single seismic impulse; in the second technique, geophone signals produced by the impulses are recorded in sequence as a plurality of side-by-side traces on a common time axis. In still another technique that has been suggested, seismic detectors are spread over an area of the earth, and the earth is impulsed at some point within or near that area. The electrical signals produced by the geophones are individually and simultaneously recorded in reproducible form as a multiplicity of traces, and at some later time, a two-dimensional plan view display corresponding to the detector array is modulated with signals produced by reproducing the seismogram such that the signal derived from any given detector modulates one and only one areal portion of the display. This technique, as described in the prior art, has not been practiced because of the high cost attendant upon manufacturing seismic equipment capable of simultaneously amplifying the number of seismic signals that would be required to produce significant results in accordance with the technique. Furthermore, the display apparatus available to the prior art has been found to be inaccurate, very difficult to construct, and of limited operating flexibility.

In accordance with one aspect of the present invention, there is used a fixed detector location and a multiplicity of seismic impulse locations, areally arranged in the vicinity of the detecting location according to a predetermined pattern. Preferably, the detecting location is located within the area defined by the transmitting locations. The earth is impulsed sequentially at each of the seismic impulse locations and a separate seismic record is produced from seismic waves detected at the detecting location. The seismic wave recordings thus produced are combined into a seismogram comprising a plurality of traces on a common time axis. An areal plan display is formed having the configuration of the area of the earth's surface that was impulsed previously, and the traces of the seismogram are used to simultaneously vary the light impinging on various segments of the areal display, the segment of the display whereon light is varied by a particular trace corresponding to the location of the seismic impulse on the earth's surface whereat was produced seismic waves corresponding to said trace.

In accordance with another aspect of the invention, a seismogram is formed by an areal seismic survey wherein seismic waves are transmitted between at least one, and preferably a plurality of seismic wave impulse points in an area and at least one detection point which may or may not be in the area, whereby reflection points on a given reflection horizon beneath the area are areally distributed in a determinable pattern. The traces are used to modulate or vary the intensity of light beams impinging on first ends of a linear array of light conduits, the other ends of which are arranged to form a surface, each fiber on the surface being located by $x$, $y$ coordinates bearing a linear relation to points on the surface of the earth covering the area over which the seismic survey is conducted. Light is projected from said other end of the light conduits to a viewing medium whereat variations in the light emitted from the light conduits as a function of time permit reproduction of the seismogram as a three-dimensional presentation, the dimensions being the two dimensions of the area over which the seismic survey was conducted, and time (which corresponds to depth).

Objects and features of the invention not evident from the above discussion will become apparent upon consideration of the following detailed description of the invention when taken in connection with the accompanying drawings, wherein.

For the purposes of this invention, the term "light conduit" or "wave guide" designates one or more rods or fibers, preferably of high refractive index, adapted to transmit light from one end to the other end thereof with high efficiency. By the term "fiberoptics" is means bundles or arrays of light-transmitting glassy or resinous rods or fibers, preferably of high refractory index, which may be imbedded or sheathed by a transparent glass or resinous substance of lower refractive index in order to optically insulate them from their surroundings. Fiberoptics are discussed in detail in a paper entitled "Fiberoptics: Principles, Properties, and Design Considerations" by Walter P. Siegmund, presented at the sixth annual meeting of the Avionics Panel, AGARD, in Paris, France, in July of 1962. Copies of this paper have been published by the American Optical Company of Southbridge, Mass.

While fiberoptics may comprise a single filament or fiber, more commonly they are formed as a plurality of filaments bound together in bundles. The individual filaments in each bundle used in this device usually are about 2.5 mil diameter and 36 separate filaments are bound together in each bundle. The filaments may be systematically arranged in the bundle so that an image detected at one end thereof will be transmitted faithfully to the other end thereof.

Figure 1:
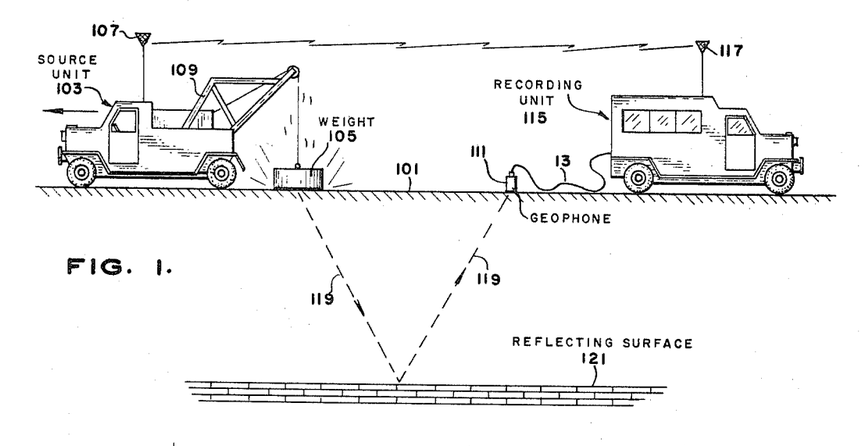
FIG. 1 is a schematic representation of apparatus for making a seismic observation in accordance with one aspect of the invention.
Figure 2:
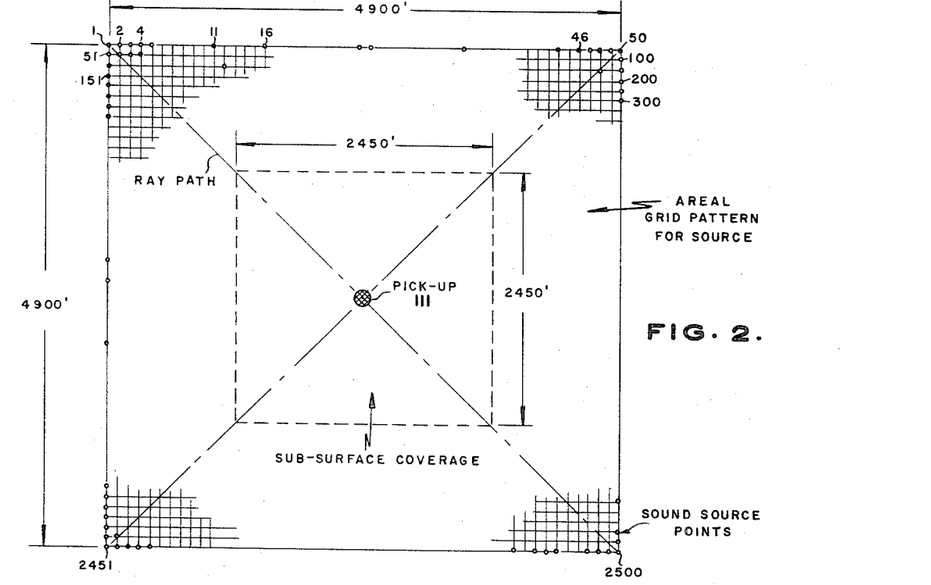
FIG. 2 is a plan view of an area of the earth illustrating the locations of a seismic detector and seismic impulse points in accordance with one aspect of the invention, and the area of the earth's subsurface delineated by the multiplicity of seismic observations from horizontal plane beds.
Figure 2A:
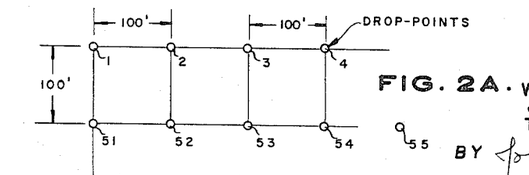
FIG. 2A is an enlargement of a portion of FIG. 2.

With reference now generally to FIGS. 1, 2, and 2A, there is illustrated a preferred technique of performing a field seismic observation in accordance with the invention. A seismic detector or geophone 111 is positioned on the earth's surface 101 at a fixed detecting point. The earth is then impulsed at a multiplicity of locations areally disposed around the pickup. These locations are designated in FIG. 2 by reference numerals 1, 2, 4, 11, 16, 46, 50, etc. It is obvious from the numerals that the earth is impulsed in the example shown in FIG. 2 at 2500 separate locations. Obviously a different number of impulse locations can be used in practice. Preferably, the grid of the impulse locations is rectangularly laid out symmetrically around the geophone 111. As will be discussed below, this is not necessary to the invention and in many instances there are distinct advantages in using a plurality of geophones disposed in a different manner on the earth's surface. This will become more evident upon a consideration of the discussion below relative to FIGS. 12 and 13.

One very practical technique for impulsing the earth in accordance with the invention makes use of a so-called "thumper" where a very heavy weight is dropped on the earth's surface to produce seismic waves, the instant of the weight drop being coordinated with the operation of a recording unit in a recording truck at a distance from the drop location. As illustrated, a truck 103 is used to transport the heavy weight 105 and to position it at different locations. A weight-lifting and drop-control unit 109 is carried by the truck for the purpose of lifting the weight and controlling the instant of drop. Preferably, the instant of drop is determined by a switch on the recording unit in truck 115 and an electrical impulse is transmitted by a radio link from antenna 117 to receiving antenna 107 and associated radio transmitting and receiving equipment on the trucks from the recorder to the weight drop control apparatus. Apparatus of this nature is conventional in the art and has been used for many years by seismic exploration companies. Weight-lifting and drop-control apparatus suitable for use in connection with the invention is described in U.S. Patent No. 2,987,907. Other practical seismic sources that can be used are dynamite, gas exploders and other controllable seismic sources know to the art.

While a single geophone is illustrated in FIGS. 1 and 2, it is manifest that a conventional geophone cluster or pattern using a multiplicity of geophones connected together so as to produce a single electrical signal on line 13 for recordation by the recorder in truck 115 may be advantageously used. Such patterns may be in the form of a star or other configuration well known to the art. Seismic waves produced by dropping weight 105 on the ground may follow a number of different ray paths before being detected by the geophone pickup 111, one such path being designated by the reference numeral 119 for seismic waves reflected from an earth interface or reflector 121.

Assuming that the drop locations are spaced apart 100 feet, as shown in FIG. 2A, the area of the earth included within the grid impulsed by the weight dropping apparatus will be a square, 4900 feet on a side. However, a smaller area of the earth's subsurface will be explored inasmuch as the reflected seismic waves do not travel in an absolutely vertical direction. Again assuming that the spacing between the drop locations is 100 feet and that the geophone is positioned at the center of the grid defined by the drop locations, the area of the earth's subsurface surveyed at any level (assuming a reflecting horizon without dip) will be approximately 2,450 feet on each side of a square having the geophone 111 at its center.

The earth is impulsed at each of the drop locations designated in FIG. 2 and a separate trace is made on a reproducible recording medium as a result of each impulse. The traces are recorded side by side in the order of numbering of the drop locations. In other words, the traces corresponding to the drops in a given linear traverse are recorded side by side in the order of position of the drops, and each group of traces are recorded side by side in the order of the positions of the traces, for example, going downward as shown in FIG. 2. The ultimate result will be a conventional seismogram comprising a plurality of traces along a common time axis from a common break point on the seismogram. This seismogram may be considered to be a composite seismogram comprising a plurality of individual seismograms, the traces in each individual seismogram corresponding to the locations of seismic disturbances along a particular linear traverse.

Figure 3:
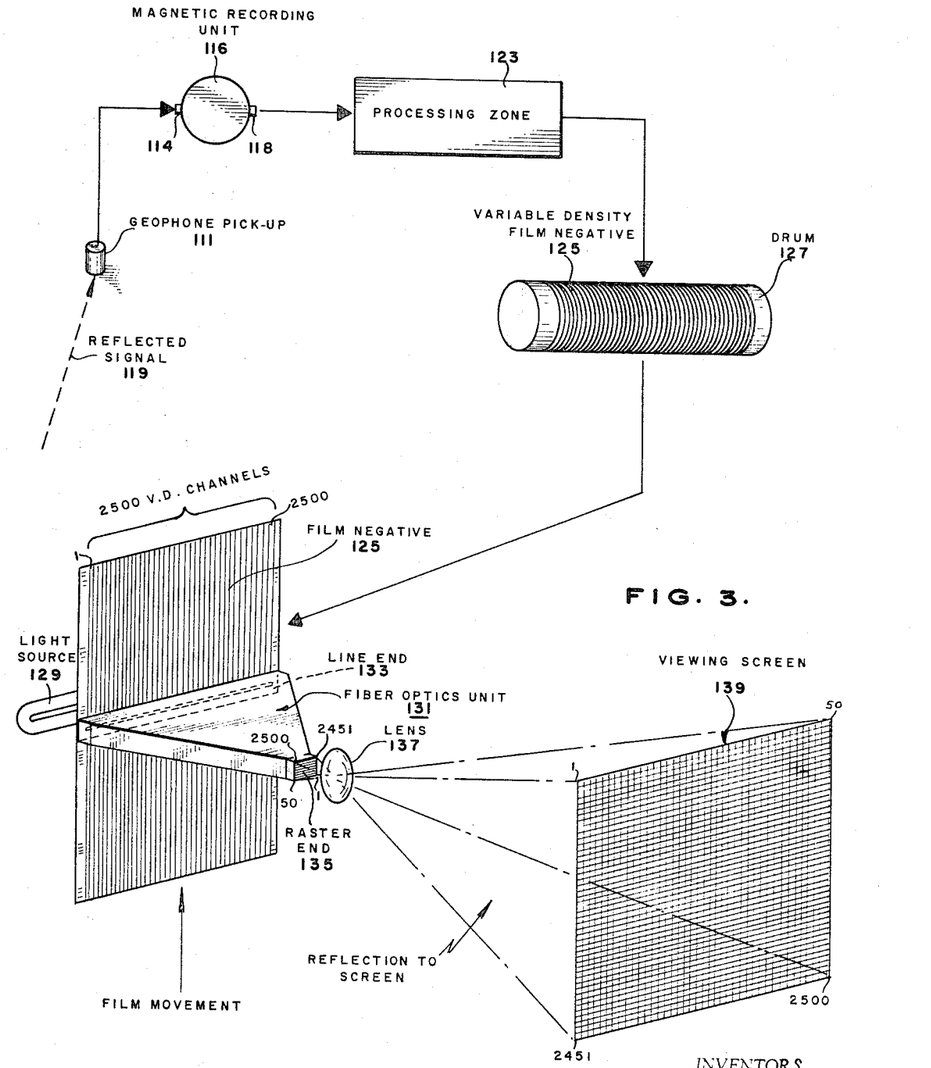
FIG. 3 is a flow diagram illustrating a technique of forming and processing seismic records in accordance with the invention.

With reference now to FIG. 3, the manner of producing seismograms and the subsequent processing thereof in accordance with the invention is shown in a flow diagram form. The seismic signals detected by geophone 111 and recorded on magnetic recording device 116 by means of magnetic recording head 114 are reproduced by a reproducing head 118. The magnetic recording device 116 may be any of a number of devices well known to the art, such as are manufactured by the Ampex Company of Los Angeles, Calif. Alternatively, other types of recording devices adapted to form reproducible seismograms (reproducible in the sense that the electrical signals that form the seismogram can be faithfully reproduced as secondary electrical signals, light signals, etc.) may be used, such as those making use of photographic techniques. The electrical signals produced at reproducing head 118 are passed to a processing zone 123 whereat they are converted to a form adapted to modulate light beams either passed therethrough or reflected thereby. The seismograms thus produced, for example, may be of the variable density type, the variable area type, or other forms well known to the art, such as the variably-spaced, parallel line seismograms described in U.S. Patent No. 3,006,713. Assuming that a variable density seismogram has been formed on a photographic film such that light passing through the film is varied in accordance with the density of the traces of the seismogram, the film negative is then slowly passed between a source of light 129 and a transducer 131 adapted to detect variations in light passed through the film 125 as the film is moved upwardly as shown between the light source and the line end 133 of the transducer, and to transmit the light passed through the film 125 to a raster end 135 whereat is formed a plan view corresponding to the plan of the area over which the earth was impulsed to form the traces of the seismogram and whereat the light variations on points of the plan area vary in accordance with the seismic signals produced as the result of impulsing the earth at the corresponding points on the earth's surface. Stated in another manner, at the raster end of the transducer, there is formed a substantially two-dimensional plan view visual display corresponding to the impulse locations over the area of the earth's surface and a given seismic trace is used to light modulate the areal portion of the display corresponding to the impulse location on the earth's surface corresponding to the given seismic trace.

The light emanating from the raster end 135 of transducer 131 is directed at a viewing screen 139 by means of a lens system 137. Thus, the display appearing on the raster end 135 is considerably enlarged. Manifestly, the image emanating from the raster end 135 of transducer 131 will be reversed by lens 137 when it appears on screen 139. The back of the screen 139 is viewed in FIG. 3 for convenience of representation, it being understood that the front of the screen ordinarily will be viewed.

Figures 4, 6, 7, 8:
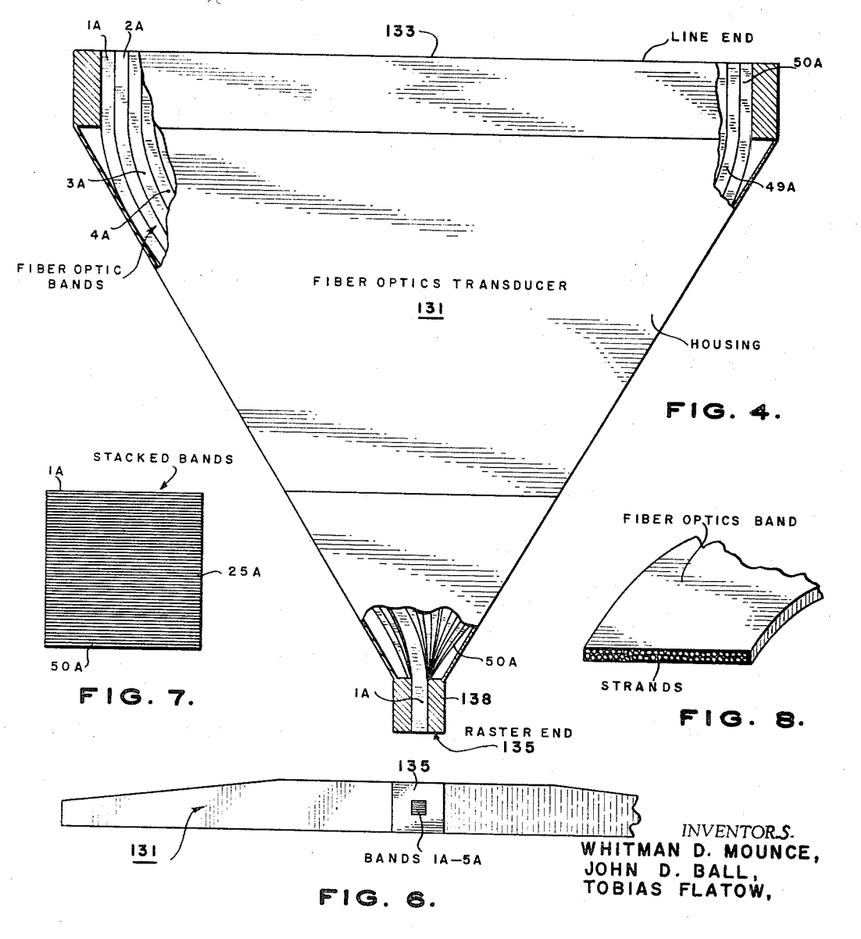
FIG. 4 is a top view, partially broken away to illustrate certain component parts thereof, of the light transducer illustrated in FIG. 3.
FIG. 6 is a back view of a portion of the light transducer.
FIG. 7 is an enlarged view of the end of the fiber optic array illustrated in FIG. 6.
FIG. 8 is an enlarged view of one of the fiber optic bands illustrated in FIGS. 6 and 7.
Figure 5:
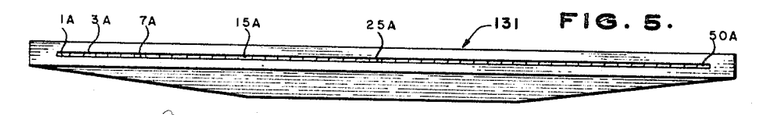
FIG. 5 is a front view of the light transducer illustrated in FIGS. 3 and 4.
Figure 9:
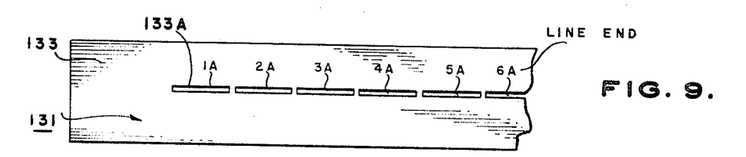
FIG. 9 is an enlarged fragmentary view of the wide end of the structure illustrated in FIG. 5.

The details of the transducer 131 are illustrated in FIGS. 4 through 9. Fundamentally, the transducer comprises a plurality of fiberoptic bands 1A through 50A linearly arranged at one end thereof and areally arranged at the other end thereof. Each of the fiberoptic bands has a width equal to the widths of the portion of the seismogram film 125 required for the presentation of 50 traces (i.e. the number of traces corresponding to the number of seismic impulses in one traverse of the area over which the seismic observations are conducted). Inasmuch as 50 traverses each comprising 50 impulse points, were used in the example of FIG. 2 there is shown in FIGS. 4 and 5, 50 fiberoptic bands linearly positioned in slots 133A and glued or clamped within the slots so as to be permanently affixed thereat. The fiberoptic bands are areally arranged at the raster end 135 thereof with the fiberoptic band 1A at the top and fiberoptic band 50A at the bottom of a layered structure with the other fiberoptic band positioned therebetween in the order of the numbering thereof as indicated in FIGS. 5 and 9. The formation of the fiberoptic band layered structure is most perspicuously illustrated in FIG. 7, which is an enlarged view of the layered structure as it is depicted in FIG. 6.

Each of the fiberoptic bands comprises a multiplicity of fiberoptic strands, each of which in turn comprises a number of fiberoptic filaments bonded together to form a single strand. As indicated above, a typical commercially available strand comprises 36 fiberoptic filaments .0004" in diameter, bonded together in an orderly arrangement with 6 filaments to a side. It is also to be noted that the filaments typically comprise a central core surrounded by two sheaths, each of different types of glass, so as to have an appropriate index of refraction for light transmitted through the central core. It is desirable that the number of strands in a given fiberoptic band be at least equal to the number of depth points in a given traverse of the area to be surveyed. A greater number of strands can be advantageously used. It is not necessary that individual strands be exactly aligned with the traces at the linearly arrayed ends thereof so that the light image of a trace is transmitted through one strand; in fact, the light image of one trace is usually transmitted through several strands.

As illustrated, the lightproof housing for the fiberoptic transducer is quite wide at one end and quite narrow at the other. At the wide line end, the fiberoptic bands are clamped side by side, and are rearranged into an areal grouping in the hollow central portion of the transducer, which tapers to the narrow block 138 at the raster end thereof. The block 138 may be formed in two pieces so that the fiberoptic bands are clamped therebetween in a central rectangular bore formed therein. Alternatively, block 138 may be of unitary construction.

While fiberoptics are the preferred form of transducer elements, other light conducting materials may be used, provided that the efficiency of transmission is very high and that little or no light escapes therefrom in passing from one end to the other.

Figure 10:
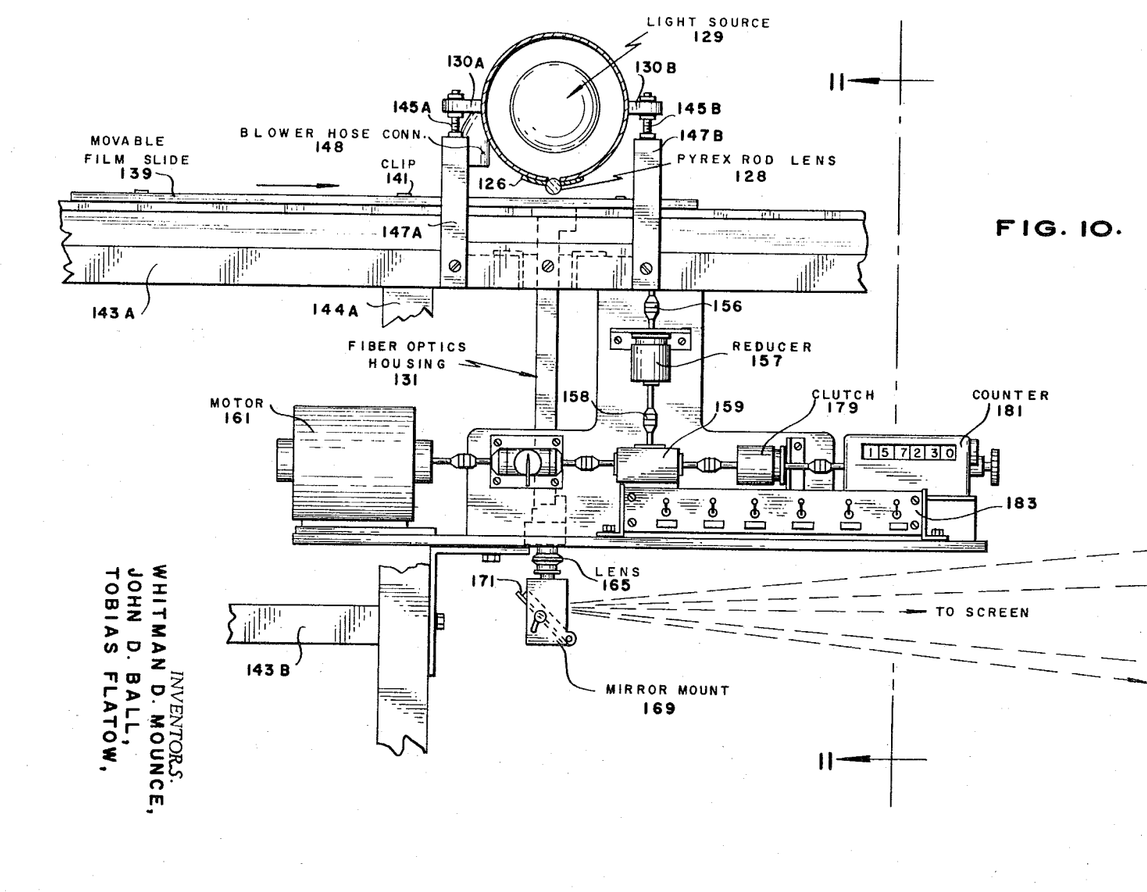
FIG. 10 is a side view of apparatus for processing and recording seismic records in accordance with an aspect of the invention.
Figure 11:
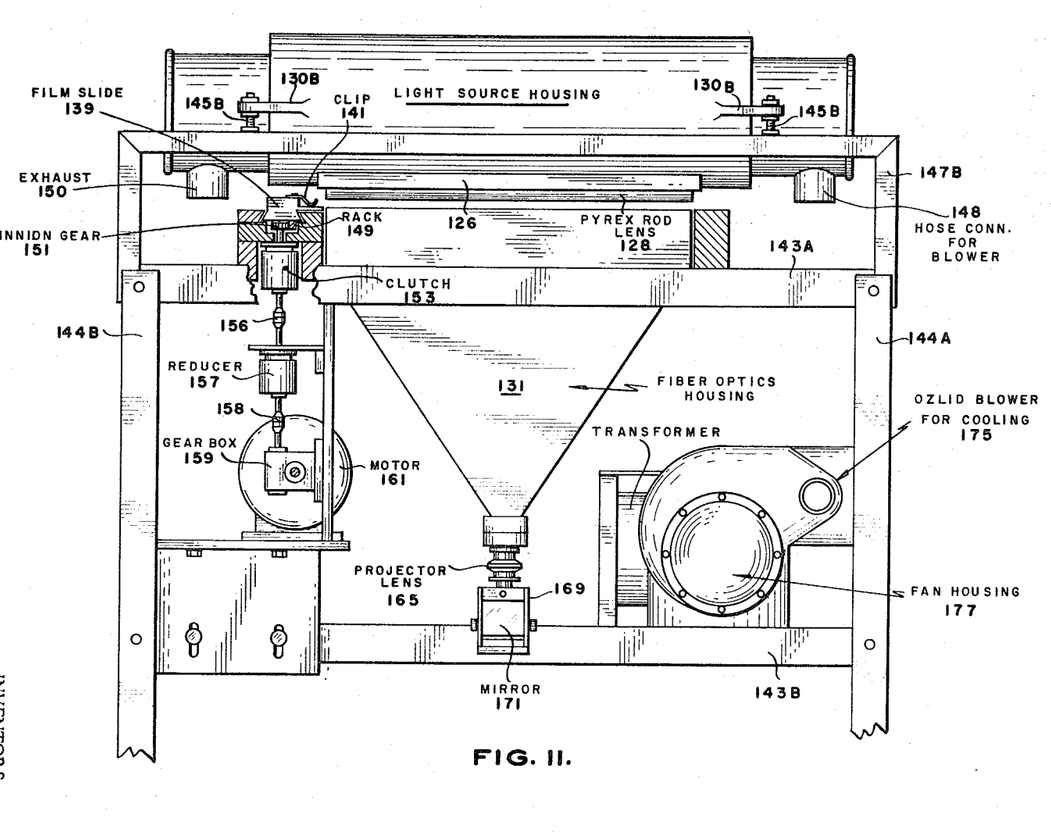
FIG. 11 is a sectional view of the apparatus of FIG. 10 taken along section 11—11.

In FIGS. 10 and 11 there is illustrated a preferred apparatus making use of the fiberoptic housing transducer described above for transporting a movable film slide 139 between a light source 129 and the line end of the transducer and for directing the light emanating from the areal end of the transducer to a viewing screen. The apparatus is mounted on a frame including horizontal members 143A and 143B and vertical members 144A and 144B, as well as other members not shown or numbered. Mounted on horizontal member 143A is a movable film slide mechanism 139 adapted to hold the film negative produced as described above, whereon is recorded a multiplicity of seismic traces. The film slide is movable horizontally back and forth in the directions shown by the arrows, and it comprises an open frame so that light can pass through the film carried thereby and be detected by the line end of the fiberoptics transducer 131. Mounted above the level of the movable film slide and positioned immediately thereover, is a high intensity light source 129, which may be an Ozalid unit of conventional design. Light from the source 129 is concentrated by a Pyrex rod lens 128. The lens 128 is positioned transversely of the longitudinal axis of the film strip, and is held on the housing of the light source by a retainer 126. The distance of the Pyrex rod lens 128 above the film strip is adjustable by means of bolts 145, extending through flanges 130A and 130B protruding from the housing of the light source 129 at each end of the housing. The bolts 145A and 145B bear against the horizontal portion of frame member 147A. The Ozalid light source is cooled from a blower 175 connected by means of a hose (not shown) to blower hose connection 148 on the light housing. Air is exhausted from the housing through exhaust port 150.

The line end of the fiberoptic housing 131 is disposed immediately below the film strip so that light directed thereon by Pyrex rod lens 128 is varied in intensity in accordance with the density or area of the film strip. The fiberoptics housing 131 is vertically mounted so that light emanating from the raster end of the fiberoptics array will be directed through a lens system 165 on mirror 171 pivotally mounted on a mirror mount 169 immediately below lens 165. Light reflected by the mirror 171 is directed against a screen 139 (see FIG. 3).

The film slide and clip 139 (see FIG. 11) has a flange and clip 141 for holding the film strip, and a rack 149 cooperatively engaging wth pinion gear 151 for moving the film slide longitudinally of the film strip along under the lens 128. The pinion gear 151 is driven from motor 161 through gear box 159, speed reducer 157, and electromagnetically actuated clutch 153, which is connected directly to the pinion gear 151. The gear box is connected to the reducer by coupling 158 and the reducer is connected to the clutch by the coupling 156. The function of the clutch 153 is to disconnect the pinion gear and rack 149 from the motor, gear box, and speed reducer so that the film slide can be moved by hand if such is advantageous. Clutch 153 also permits the film to be stopped when it is desired to view the portion of the seismogram being displayed for a long period of time.

A rotation counter 181 is connected to gear box 159 through counter clutch 179. The function of clutch 181 is to provide an indication of the position of the film relative to lens 128 and fiberoptics housing 131. The counter may be calibrated so that the units wheel thereof changes digit with each movement of the film strip corresponding to one millisecond on the time axis of the original recordings.

Figure 15:
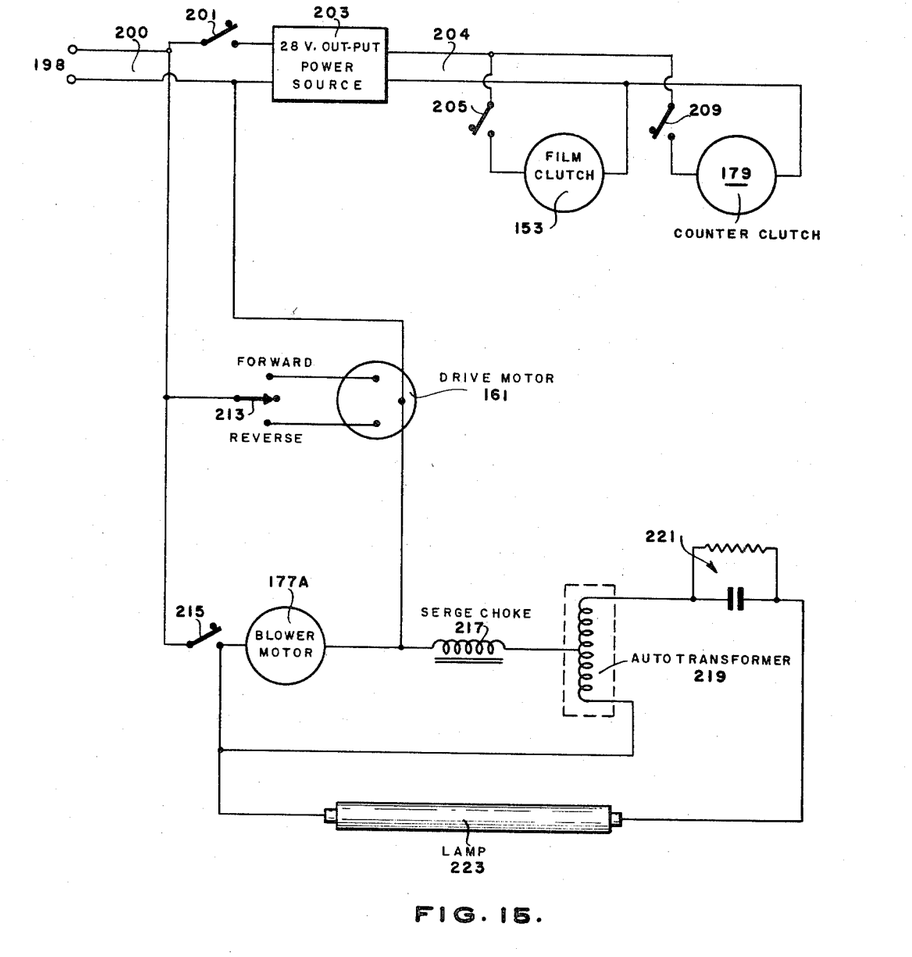
FIG. 15 is an electrical schematic diagram of electrical control equipment for the apparatus illustrated in FIGS. 10 and 11.

The electrical circuit for controlling the electrical components of the system described immediately above is illustrated in FIG. 15. Terminals 198 for connection to a 115-volt AC source, as connected to a 28-volt output power supply 203 by means of lines 200 and on-off switch 201. The output lines 204 of the 28-volt source are connected to the electromagnetically actuated film clutch 153 and the counter clutch 179 through switches 205 and 209 respectively. The terminals 198 are also connected to a reversible drive 115-volt A.C. drive motor through a 3-positioned switch 213 permitting the drive motor to be selectively disconnected from the source and to rotate in a forward or in a reverse direction for driving the rack and gear mechanism of the film drive. The 115-volt source also energizes the light source. Lamp 223 is connected across the terminals 198 through switch 215, parallel connected condenser and resistor 222, autotransformer 219, and surge choke 217. The blower motor 177A for cooling the lamp 223 is actuated upon closure of switch 215 at the same time that the lamp is actuated.

The operation of the apparatus described above with respect to FIGS. 10, 11, and 15 is as follows. Initially, switch 215 is closed to ignite the lamp and to start blower motor 177A. After a period of about five minutes (the time required for the Ozalid lamp to achieve operating brilliance), drive switch 213 is switched to the forward drive connection of the drive motor 161. The motor will drive the film slide and clip underneath the Pyrex rod 128 so that the light passing from the lamp 223 to the line end of the fiberoptics assembly will be varied or modulated in accordance with the density of the film. The light will be transmitted from the line end of the fiberoptics housing by the fiberoptics from the raster end thereof and projected on the screen through the mirror 171 and lens 165. Whenever it is desired to stop the film in order to view the presentation for a long period of time, switch 205 is opened momentarily. When the end of the film strip has been reached, drive switch 213 is thrown to the reverse position thereof so that the drive motor will return the film strip to its initial position.

Figure 14:
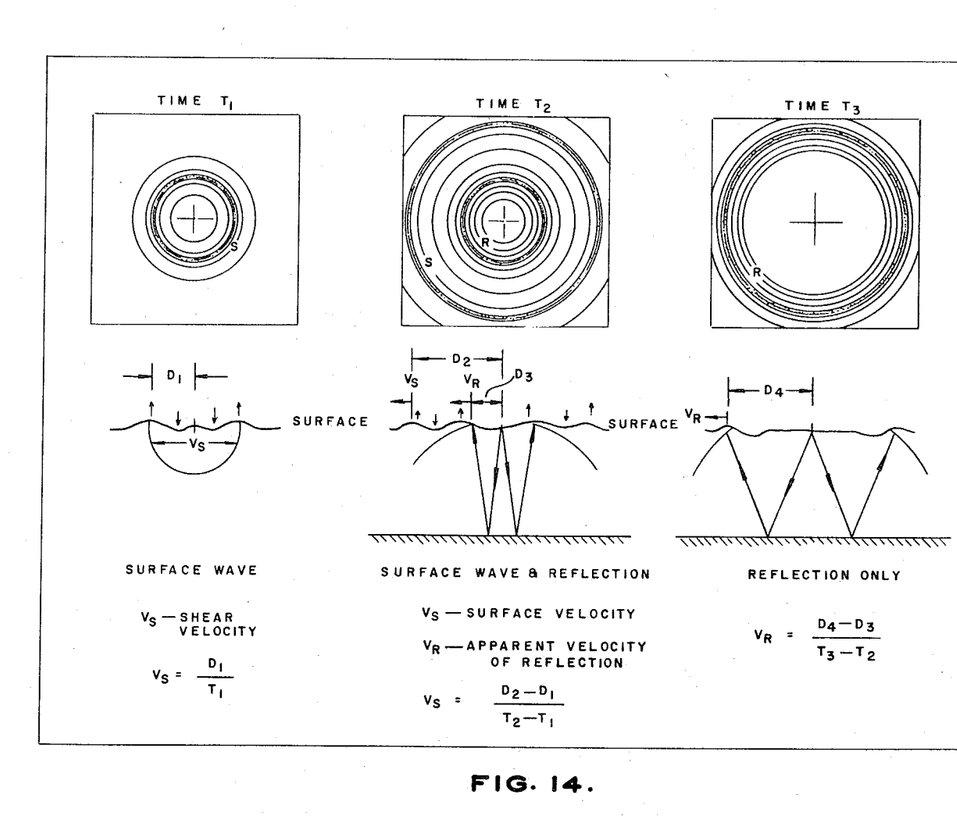
FIG. 14 illustrates views of a portion of the earth viewed from above the earth and sectionally through the earth at various times after a seismic impulse.

The over-all operation of the apparatus described above will now be considered. As has been stated, the earth is impulsed on a rectilinear grid at a symmetrically arranged multiplicity of locations on the earth's surface. This impulsing of the earth's surface is not simultaneous but is consecutive, the earth being impulsed at a single location at a time. With each impulsing of the earth the resulting seismic waves are detected at a single, fixed location or detecting point and are recorded in reproducible form. Each recording or trace is on a common time axis so that the ultimate result is a seismogram of a multiplicity of traces, beginning at a common time reference point, or "break point." Insofar as seismic waves directly produced by the seismic impulses are concerned, the seismogram will contain all of the events that would appear thereon were the earth impulsed at the location of the detector and the resulting seismic waves detected at the locations of the impulse points. All of the direct reflections, ground roll events, air wave events, events from localized reflectors such as large rocks embedded in the earth, refracted waves, etc., will appear in the seismogram formed as described above in the same manner as in a seismogram formed using a single impulse point and a multiplicity of detecting stations due to the law of reciprocity. When the seismogram is reproduced on film and processed through the apparatus shown in FIGS. 10 and 11, the seismic events appearing on this display, particularly those resulting from direct reflections from subsurface reflecting horizons, will be evidenced as rings of gradually increasing diameter. Ground roll events and certain other events will be evidenced in like manner. This situation is particularly well displayed in FIG. 14. At the time $T_1$, an outwardly traveling shearwave S is the only event that is particularly identifiable, time $T_1$ being shortly after what would ordinarily be assumed as the time of the seismic impulse. At time $T_2$ the shearwave component appears at a greater distance from the center of the presentation, and the first reflections from subsurface reflecting horizon H appear on the record as band R, close to the center of the presentation. At time $T_3$ the events produced by the shearwave no longer appear on the presentation, and the events produced by reflections from reflecting horizon H appear as a very large diameter band. The visual effect is the same as if one were viewing seismic waves appearing on the earth's surface as the result of a seismic impulse at the geophone location. This is true even though what is actually being presented is a record of travel times of seismic waves between a multiplicity of impulse locations and a detecting location or locations, not the waves themselves. The effect is such, however, that the viewer has the illusion of actually seeing seismic waves coming up from the earth's subsurface or rolling across the earth's surface. The relative velocities of outward propagation of the various types of seismic waves (reflections, multiple reflections, shearwaves, etc.) make it possible to readily identify the various types of seismic waves and to determine their time of arrival at various points on the surface of the earth. The horizontal velocity of shearwaves, for example, is quite low, whereas the apparent horizontal velocity of reflections is relatively high.

Figure 12:
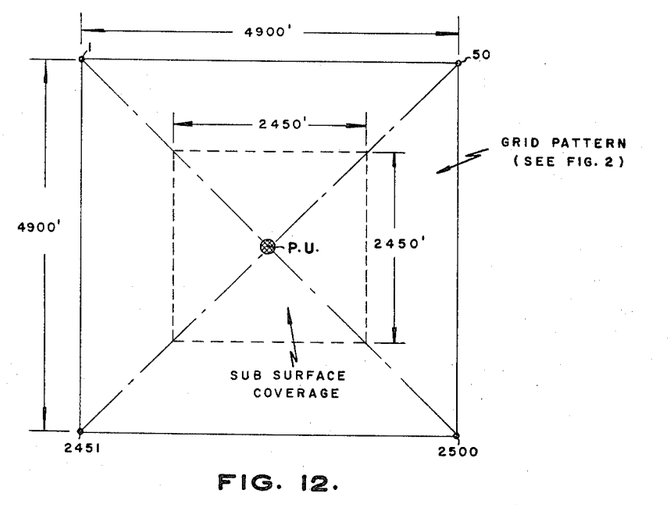
FIGS. 12 and 13 are ray path diagrams for flat beds that illustrate a technique for expeditiously defining the subsurface in accordance with an aspect of the invention.
Figure 13:
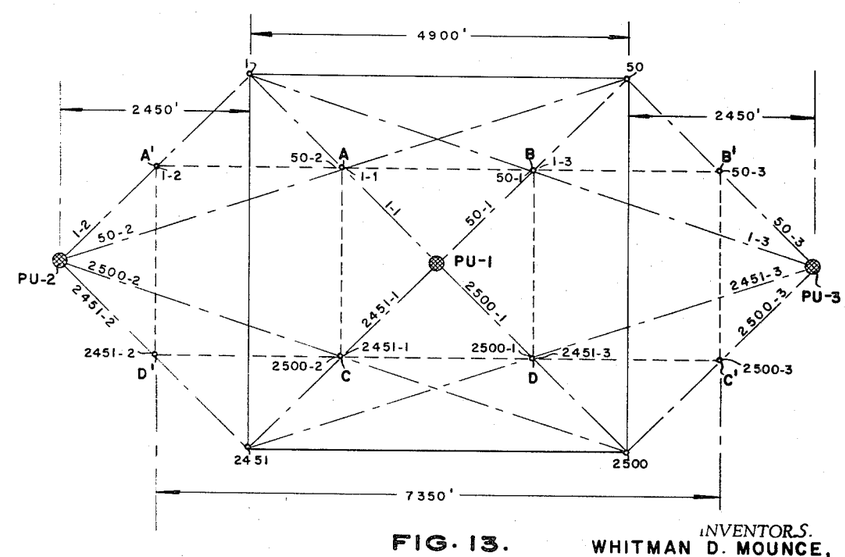

FIGS. 12 and 13 illustrate a manner of extensive seismic prospecting in accordance with the invention. FIG. 12 is a simplified presentation similar to FIG. 2 illustrating a grid pattern of 2500 seismic impulse points, comprising 50 traverses of 50 impulse points each, side by side, each of the impulse points being spaced 100 feet from adjacent impulse points. As discussed above, the area at any particular level of the earth's subsurface that is explored when this grid arrangement is used will be a square about 2450 feet on each side for flat beds. This will prevail when the seismic detecting location PU is at the exact center of the grid. Now let it be assumed that the same grid pattern of seismic impulse points is used as illustrated in FIG. 13, but that three seismic detecting locations are utilized, respectively designated PU–1, PU–2, and PU–3. PU–1 is located at the center of the square defined by the grid, whereas PU–2 is located 4900 feet to the left of PU–1 and PU–3 is located 4900 feet to the right of PU–1. In other words, PU–2 and PU–3 are located a distance from PU–1 on each side thereof, equal to the distance of the seismic traverses and disposed in a line parallel to the seismic traverses. The square denoted by the reference letters A, B, C, and D will designate the area of the earth's subsurface surveyed using the grid of impulse points in combination with PU–1. From the ray paths drawn between the corner impulse points of the grid and the detecting locations PU–2 and PU–3, it is manifest that the rectangle A'AD'C defines the area of the earth's subsurface at any given level that is surveyed using the stated grid of impulse locations and PU–2, and further, that using detecting location PU–3 in combination with the grid of impulse locations, the rectangle BB'DC' defines the area of the earth's subsurface at any given level that will be surveyed thereby assuming a flat bed. Thus, by using three pickup locations in line parallel with the lines of traverses being used, three very large areas of the earth's subsurface at any particular level can be seismically surveyed.

Figure 16:
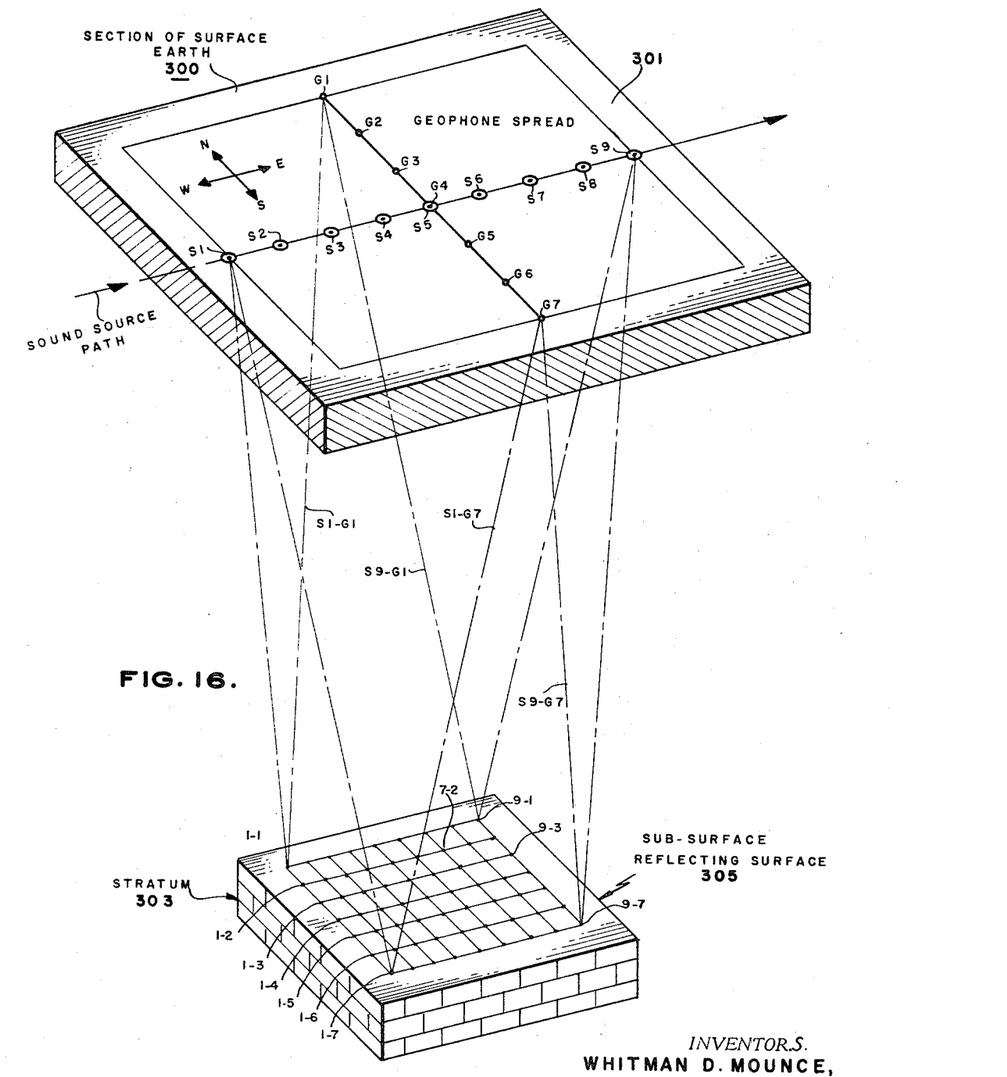
FIG. 16 is an elemental perspective view of a fragment of the earth illustrating the locations of seismic detectors and seismic impulse points at or near the surface of the earth, along with a zone of the earth's subsurface defining an area delineated by seismic observations in accordance with another aspect of the invention.

In FIG. 16 there is illustrated a preferred technique for carrying out the field portion of the invention. A section 300 of the earth, including the earth's surface 301, is illustrated as being located above a plane, horizontal subsurface reflecting horizon 305 which may be considered to be the upper surface of earth stratum 303. A plurality of geophone locations designated by reference numerals G1, G2, G3, G4, G5, G6, and G7 are located along a line substantially perpendicular to a line of impulse locations on the earth's surface respectively designated by the reference numerals S1 through S9. Preferably, the line of geophones is substantially orthogonal to the line of impulse locations, although this is not absolutely necessary. It is desirable, however, to keep the two lines substantially perpendicular by maintaining them within 10 or 15 degrees of being at right angles to each other. Assume now that a seismic disturbance is generated at impulse location S1, as by exploding dynamite, dropping a heavy weight, or vibrating the earth thereat. Manifestly, seismic waves will be propagated in all directions from the location S1, and the ray paths followed by reflected seismic waves from location S1 to reflecting horizon 305 and back to geophones G1 and G7 will be as designated by reference characters S1–G1 and S1–G7, respectively. The reflection points of seismic waves detected by the geophones G1 through G7 as a result of a seismic disturbance produced at location S1 are designated respectively 1–1, 1–2, 1–3, 1–4, 1–5, 1–6, and 1–7. Likewise, the seismic waves reflected from reflecting horizon 305 as a result of a disturbance produced at location S9 and detected by an array of geophones at the indicated locations will be reflected at points between the reflecting points 9–1 and 9–7. The reflecting points on the reflecting horizon 305 for seismic waves produced at all of the locations S1 through S9 will form the grid bounded by the corner locations 1–1, 9–1, 9–7, and 1–7. The reflecting points from any particular impulse location to any particular geophone location can be easily determined; for example, the reflecting points of seismic waves produced at impulse location S7 and detected at geophone location S2 is designated on the drawing by reference numeral 7–2.

In practice, an elongated swath of the earth's subsurface can thus be delineated by arranging a line of geophones, as indicated, intersecting the line of impulse locations at S5, impulsing the earth at locations S1 through S4, arranging another array of geophones along a line intersecting impulse location S9, sequentially producing seismic disturbances at impulse locations S5 through S8 and detecting seismic waves with both arrays of geophones and individually recording the geophone signals, then moving the first array of geophones to the other side of the second array of geophones, threafter producing seismic disturbances at a third sequence of locations along the line designated by the arrow beginning with the location S9 and, while detecting and recording seismic waves with both arrays of geophones, thereafter continuing the process for as long as desired. Thus, with two arrays of geophones, a wide swath of the earth's subsurface can be seismically prospected. Manifestly, seismic waves will be simultaneously detected by both arrays of geophones after the first sequence of impulses (as at impulse locations S1 through S4) has been completed.

Where the amount of recording equipment is limited to one array of geophones and corresponding recording channels, the following field procedure may be used. After seismic observations have been completed by producing seismic disturbances at locations S1 through S9, the array of geophones is moved in the direction of the line on which it is located. For example, assuming that the array is moved to the north as indicated in FIG. 16, the array as a whole will be transferred until the geophone formerly at location G7 is at location G4; i.e., a distance equal to half the length of the array. Seismic observations will then be made by producing seismic disturbances along a line passing through location G1 and parallel to the line passing through locations S1 through S9. This process of transferring the geophone array by half its length and producing seismic disturbances is repeated time after time to delineate a swath of the earth's subsurface along a north-south traverse, as indicated in FIG. 16.

Manifestly, the distance between adjacent geophones need not be the same as the distance between adjacent seismic disturbance locations nor need the length of a geophone array be equal to the distance between the end locations of a particular group of seismic disturbance locations. It is preferable, however, that both the distance between adjacent geophones and the distance between adjacent disturbance locations be kept substantially constant.

When seismic prospecting in lakes or at sea, it is possible to locate both a seismic source and a single seismic detector at substantially the same location on a boat and to produce seismic impulses at each of a multiplicity of locations on a grid such as shown in FIGS. 2 and 2A, detecting seismic waves with the detector and recording the output signals thereof as a single trace after each impulse. The traces will be formed into a composite seismogram with the individual traces aligned side by side in the order of the numbers of the positions of the seismic disturbance locations on the grid, such as are indicated in FIGS. 2 and 2A. The composite seismogram may then be processed as described above with respect to FIGS. 3 through 11.

When the seismograms thus produced are to be processed on the apparatus described above, a composite seismogram is produced from each of the seismograms individually produced as a result of a single seimsic disturbance, the individual seismograms being recorded side by side in the order of the seismic disturbance locations corresponding thereto. The composite seismogram can then be played back, as described above with respect to FIGS. 4 through 11. The resulting display will be the equivalent of the entire surface of the earth being simultaneously impulsed at the various impulse points.

As has been mentioned, the seismic source used for performing the seismic observations can be any of a number of sources, such as dynamite, a heavy weight dropped on the earth's surface, or an earth vibrator. When a vibrator is used to perform what is known as continuous wave prospecting, it is customary to form a seismogram by correlating a detected signal with a signal corresponding to the seismic signal transmitted into the earth, which may be obtained by means of a geophone on or near the vibrator, or by using the electrical signal having a waveform corresponding to the signal used to drive the vibrator. This particular type of seismogram, often called a correlogram, is conventionally formed according to techniques well known to the art and will not be further discussed herein.

The invention is not necessarily to be restricted to the specific structural details, arrangement of parts, or circuit connections herein set forth, as various modifications thereof may be effected without departing from the spirit and scope of the invention.

What is claimed is:

1. The method of seismic surveying comprising:
   performing a plurality of seismic observations at a plurality of seismic wave terminus locations disposed over an area of the earth's surface;
   from said seismic observations, producing a composite reproducible seismogram comprising a plurality of lineal multitrace sections each corresponding to a line of reflection points on a subsurface reflecting horizon;
   with said seismogram, varying light impingement on one end of an array of a plurality of linearly arranged elongated light-transmitting wave guide elements, each trace of said seismogram modulating light impingement on at least one given element of said array; and directing light from the other end of said light-transmitting array at a two-dimensional display so that light from each given element of said array illuminates an areal portion of the display corresponding a location on said display to the location of a reflection point on said reflecting horizon.

2. The method of seismic prospecting comprising:

producing a seismic impulse in succession at each of a multiplicity of ground-spaced locations over an area of the earth's surface;

at a seismic wave detecting location, detecting earth movements resulting from each of said seismic impulses, and generating electrical signals in response to said detection;

from said electrical signals, producing a composite seismogram with the individual traces thereof corresponding to the individual seismic impulses positioned side by side;

with said composite seismogram, varying light impingement on one end of a light-transmitting array comprising a plurality of light-transmitting wave guide elements, each trace of said seismogram modulating at least one given element of said array; and directing light from the other end of said light-transmitting array at a two-dimensional display homologous to the impulse locations over said area so that light from said at least one given element of said array illuminates an areal portion of the display corresponding in location on the display to the impulse location on said area corresponding to the trace that modulates light impinging on said one end of said at least one given element.

3. A method of seismic surveying an area of a subsurface seismic wave reflecting horizon comprising:

producing a seismic disturbance in succession at each of a multiplicity of spaced-apart locations along a first line on the earth's surface;

detecting earth movements resulting from each of said seismic disturbances at each of a plurality of spaced-apart detecting locations along a second line intersecting said first line at substantially right angles to said first line;

producing a composite seismogram comprising a plurality of lineal multitrace seismograms each corresponding to detected seismic waves detected as a result of a particular one of said seismic disturbances;

with said composite seismogram, varying light impingement on one end of an array of a plurality of elongated light-transmitting wave guide elements; and directing light from the other end of said light-transmitting array at a substantially two-dimensional display so that light from each given element of said array illuminates an areal portion of the display corresponding in location on said display to the location of a reflecting point on said subsurface seismic wave reflecting horizon responsible for a reflection event on the trace of said composite seismogram that varies light impingement on said one end of said given element.

4. The method of claim 1 wherein the plurality of seismic observations are performed by producing seismic disturbances and detecting resulting seismic waves at substantially the same location.

5. The method of claim 1 wherein the plurality of seismic observations are performed by producing seismic disturbances at a plurality of locations linearly arranged on the earth's surface, and detecting seismic waves produced by each of said seismic disturbances arranged on a line substantially perpendicular to the line of seismic disturbances.

6. The method of claim 1 wherein the plurality of seismic observations are performed by producing a seismic disturbance in succession at each of a multiplicity of ground spaced locations over an area of the earth's surface, and at a seismic wave detecting location, detecting earth movements resulting from each disturbance.

7. The method of claim 3 wherein light from each given element of the array illuminates an areal portion of the display corresponding in location on said display to the location of a reflecting point on a substantially horizontal plane seismic wave reflecting horizon beneath the area of the earth's surface bounded by the extremities of said first and second lines.

8. The method of seismic surveying comprising:

producing seismic disturbances in sequence at a plurality of seismic disturbance locations along a first line on the earth's surface;

detecting seismic waves produced by said disturbances at detecting locations linearly disposed along a second line intersecting and substantially perpedicular to said first line;

producing a plurality of multitrace seismograms each corresponding to one of said disturbances;

forming a two-dimensional display comprising a plurality of parallel linear elements; and modulating light impinging on each of said parallel linear elements with said multitrace seismogram, the light on each element being modulated by a particular seismogram, said elements corresponding to particular seismograms being arranged in the order of seismic disturbance locations corresponding thereto.

References Cited

UNITED STATES PATENTS

| | | | |
|---|---|---|---|
| Re. 25,204 | 7/1962 | Becker | 181—.5 |
| 2,939,362 | 6/1960 | Cole | 88—24 X |
| 2,951,736 | 9/1960 | Black | 346—108 |
| 3,125,683 | 3/1964 | Stewart et al. | 88—1 X |
| 3,215,031 | 11/1965 | Alexander et al. | 346—33 |
| 3,240,286 | 3/1966 | Musgrave | 181—.5 |

FOREIGN PATENTS 726,307   1/1966   Canada.

RODNEY D. BENNETT, *Primary Examiner.*

C. E. WANDS, *Assistant Examiner.*